Dec. 10, 1957  E. H. OTTERPOHL ET AL  2,815,637
BALE BUNCHER AND WINDROWER
Filed Oct. 17, 1955  2 Sheets-Sheet 2
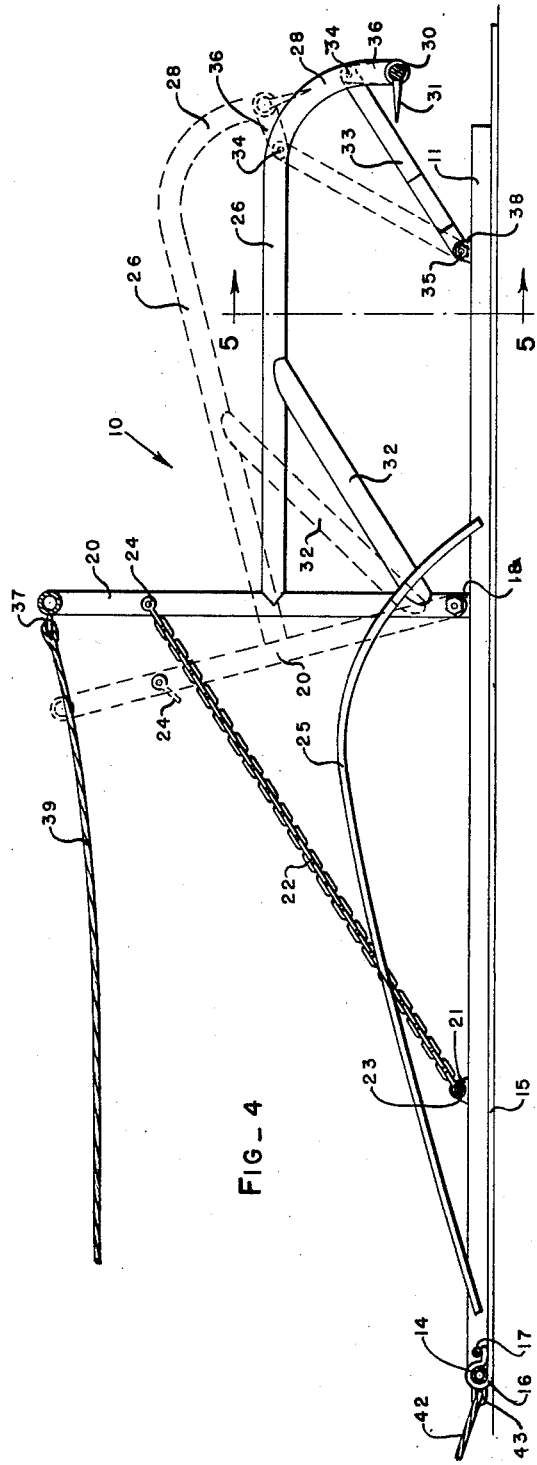
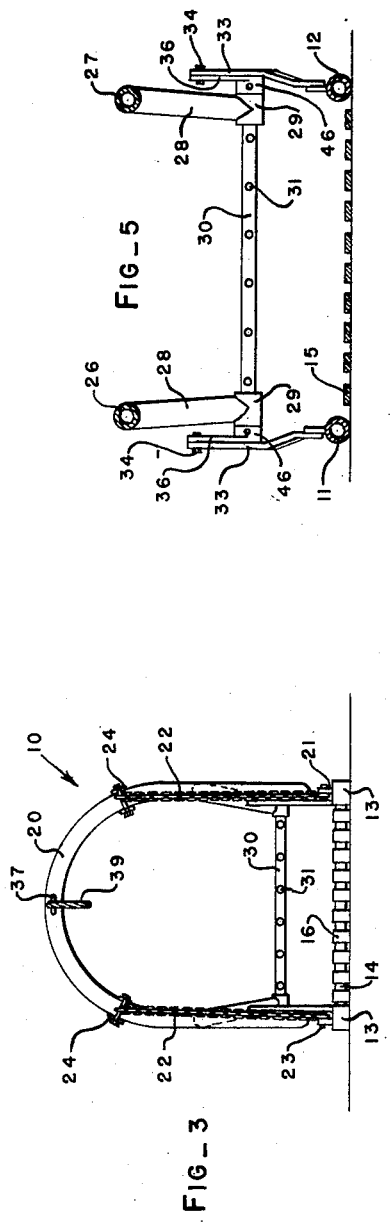
INVENTOR.
EDWARD H. OTTERPOHL
LOUIS WOHLERS
BY
*Patrick D. Beavers*
ATTORNEY

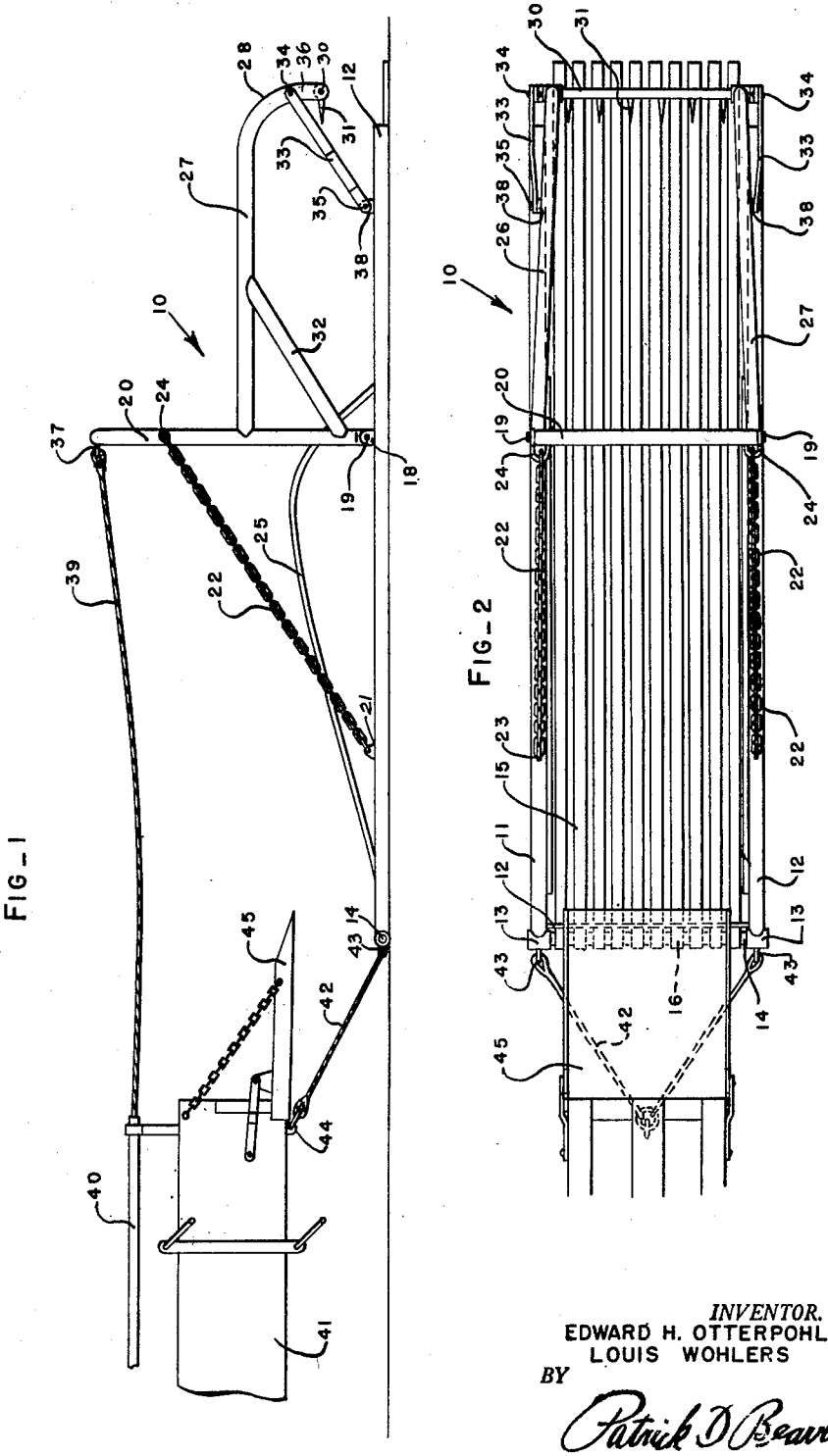

2,815,637
BALE BUNCHER AND WINDROWER

Edward H. Otterpohl and Louis Wohlers,
Missouri Valley, Iowa

Application October 17, 1955, Serial No. 540,920

1 Claim. (Cl. 56—473.5)

This invention relates to improvements in agricultural implements and more particularly to a bale buncher and windrower.

An object of this invention is to provide a device of this type that will be positioned behind a baler to catch and hold the bales as they are ejected from the baler. When a plurality of bales have been deposited on the device, the bales will be discharged from the device in a single pile. The piles can be distributed in rows in the field, thus eliminating the process of picking up each bale individually. The elimination of the foot work connected with the collection of single bales will expedite transportation of the bales to the barn.

A further object of the invention, therefore, is to provide a device of this type that will save manpower as well as time in the collection of the bales. As an example of this, in a field test it required four men approximately one hour to load 465 bales and transport them to the barn. Under the single pick-up procedure, with the same amount of bales, it would have required six men approximately four hours.

With the above and other objects and advantages in view, the invention consists of the novel details of construction, arrangement and combination of parts more fully hereinafter described, claimed and illustrated in the accompanying drawings in which:

Fig. 1 is a side elevational view of the device embodying the invention in attached, operative relation to the rear of a baler;

Fig. 2 is a top plan view of Fig. 1;

Fig. 3 is a front view of Fig. 1;

Fig. 4 is an enlarged longitudinal sectional view of the device showing in dotted lines the bale releasing position; and Fig. 5 is a vertical sectional view on the line 5—5 of Fig. 4.

Referring more in detail to the drawings, wherein like parts are designated by like reference numerals, the bale buncher and windrower embodying the invention is generally designated by the reference numeral 10.

The bale buncher 10 comprises a pair of tubular runners or skids 11 and 12 that are provided with a coupling 13 on each forward end thereof to receive a cross bar 14.

A plurality of equally spaced straps or bands 15 is provided with looped ends 16 whereby the straps or bands 15 are looped over and connected to the cross bar 14 by welding or the like. The straps or bands 15 extend longitudinally of the runners 11 and 12 and a rod 17, extending transversely of the straps or bands 15 and parallel to cross bar 14, is secured to the looped ends 16 by welding or the like, see Fig. 4. The rod 17 retains the straps or bands 15 in spaced parallel relation to each other. The rod 17 also gives a spring action to the straps or bands 15, so that when turning a corner the straps or bands 15 will move to some extent, but the spring action of the rod 17 will cause the straps or bands 15 to move back into their spaced parallel relation to each other after the corner is turned and the bale buncher is again travelling on a straight course.

Each of the runners or skids 11 and 12 is provided, at approximately the center thereof, with a vertically disposed apertured ear 18 to which is pivotally connected by pivot bolts 19 a tubular arch portion 20.

Forwardly of the apertured ears 18, each of the runners or skids 11 and 12 is provided with a second apertured ear 21, to which one end of a chain 22 is connected by means of a bolt 23. The chain 22 at the opposite ends being connected by a clevis 24 to opposite sides of the arch 20. The chains 22 prevent rearward movement of the arch 20. A semi-elliptical guard rail 25 is connected at one end to each of the runners or skids 11 and 12, respectively, adjacent the forward edge thereof. The guard rails extend toward the rear of the runners or skids 11 and 12, respectively, to be connected thereto at the rear ends.

Extending rearwardly of each side of the arch 20, at right angles thereto and in parallel converging relation to each other, is a pair of supporting bars 26 and 27. The ends of the bars 26 and 27 are of arcuate formation as at 28 and the ends thereof have a coupling 29 thereon to loosely receive a rod 30 on which is positioned forwardly extending, equally spaced parallel teeth 31.

A diagonally extending brace 32 is connected between the bars 26 and 27 and the sides of the arch 20 and a second pair of diagonally extending braces 33 is pivotally connected at pivot 34 to short levers 36 and to apertured ears 38 on the runners 11 and 12 by pivot bolts 35. The opposite ends of the levers 36 being connected by a coupling 46 to the opposite ends of the bar 30.

A clevis 37 is connected to the center of the arch 20 to receive one end of a cable 39 which extends to a cable guide 40 on the rear of a baler 41. A cable 42 is connected at 43 to the opposite ends of the bar 14 and to a hitch 44 on the baler 41.

Viewing Fig. 1, it will be noted that the tail gate 45 of the baler 41 extends over the forward end of the bale buncher 10. Thus as the bales leave the baler 41, they will fall onto the straps or bands 15. As the baler moves forward the bales will be deposited and moved rearwardly on the straps or bands 15 until the first bale engages the teeth in the bar 30. When it is desired to dump the bales, the cable 39 is pulled, moving the arch 20 forwardly on its pivots 19. The bars 26 and 27 will move upwardly as shown in dotted lines, Fig. 4, the bar 30 will rotate so that the teeth 31 will move downwardly and rearwardly to disengage themselves from the bale, and the bales will slide off of the bale buncher and windrower. When the last bale has been dumped, the cable 39 will be released and the arch 20 will assume its normal position. The guard 25 will prevent the bales from falling laterally off of the bale buncher and windrower 10.

The bale buncher and windrower embodying the invention will save considerable time and manpower and it is believed that the construction and manner of use of the bale buncher and windrower will be apparent to those skilled in the art, it is also to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

A bale buncher comprising a pair of spaced parallel skids, a plurality of straps mounted in spaced parallel relation to each other and to said skids, means interconnecting said skids and straps, an arch pivotally mounted on said skids for forward and rearward movement, means for limiting the rearward movement of said arch, a pair of bars affixed to and extending rearwardly from said arch, a transverse rod pivotally mounted in the rear end portions of said bars, a pair of normally upwardly extending levers affixed to said rod, a link interconnecting each lever with one of said skids, and a plurality of normally forwardly extending teeth mounted upon said rod.

References Cited in the file of this patent

UNITED STATES PATENTS

| | | |
|---|---|---|
| 2,221,719 | Peterson | Nov. 12, 1940 |
| 2,649,982 | Ray | Aug. 25, 1953 |
| 2,672,808 | Eldert | Mar. 23, 1954 |